United States Patent [19]
Pieterse et al.

[11] Patent Number: 5,835,513
[45] Date of Patent: Nov. 10, 1998

[54] Q-SWITCHED LASER SYSTEM PROVIDING UV LIGHT

[75] Inventors: Jan-Willem Pieterse, San Jose; Alan B. Petersen, Palo Alto; Chris Pohalski, Mountain View; Emily Cheng, Sunnyvale; Randall Lane; William L. Nighan, Jr., both of Menlo Park, all of Calif.

[73] Assignee: Spectra Physics, Inc., Mt. View, Calif.

[21] Appl. No.: 780,495

[22] Filed: Jan. 8, 1997

[51] Int. Cl.⁶ .................................................... H01S 3/10
[52] U.S. Cl. ............................... 372/22; 359/328
[58] Field of Search .................. 372/22, 5, 10; 359/328

[56] References Cited

U.S. PATENT DOCUMENTS 5,274,650  12/1993  Amano ........................................ 372/22

*Primary Examiner*—Leon Scott, Jr.
*Attorney, Agent, or Firm*—Wilson Sonsini Goodrich & Rosati

[57] ABSTRACT

A diode pumped laser includes a high reflector and an output coupler defining a resonator. The resonator includes a gain medium and a Q-switch and produces a fundamental beam. A first non-linear crystal is positioned extra-cavity of the resonator along a path of the fundamental beam. The first non-linear crystal generates a second harmonic beam from the fundamental beam. The first non-linear crystal is critically phased matched. A second non-linear crystal is portioned extra-cavity of the resonator along a path of the fundamental beam and the path of the second harmonic beam. The second non-linear crystal produces a third harmonic beam. The second non-linear crystal is critically phased matched.

15 Claims, 3 Drawing Sheets

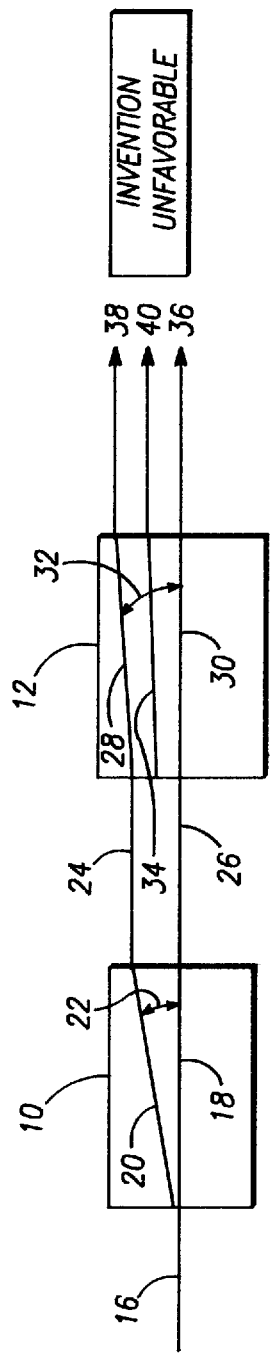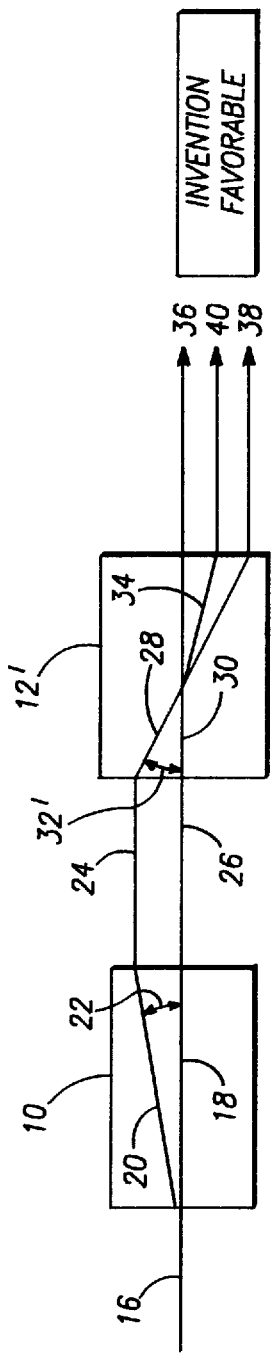

Q-SWITCHED LASER SYSTEM PROVIDING UV LIGHT

FIELD OF THE INVENTION

This invention relates to diode-pumped solid-state lasers, and in particularly to diode-pumped solid-state laser systems that provide harmonically converted output.

BACKGROUND OF THE INVENTION

Diode-pumped Nd:YVO$_4$ lasers have been used in applications that require short pulses (<20 nsec) at high repetition rates (>10 kHz). See for example M. S. Keirstead, T. M. Baer, S. B. Hutchison, J. Hobbs, "High repetition rate, diode-bar-pumped, Q-switched Nd:YVO$_4$ laser", in Conference on Lasers and Electro-Optics, 1993, Vol. 11, OSA Technical Digest Series (Optical Society of America, Washington, D.C., 1993), p. 642, and S. B. Hutchison, T. M. Baer, K. Coy, P. Gooding, D. Head, J. Hobbs, M. Keirstead, and G. Kintz, *Diode Pumping of Average-Power Solid State Lasers*, Proc. SPIE 1865, 61 (1993). These reports describe operation of Nd:YVO$_4$ lasers in a manner that provides short pulses at high repetition rate, as does W. L. Nighan, Jr., Mark S. Keirstead, Alan B. Petersen, and Jan-Willem Pieterse, "Harmonic generation at high repetition rate with Q-switched Nd:YVO$_4$ lasers", in SPIE 2380-24, 1995, which discloses generation of Q-switched pulses with an end-pumped, acousto-optically Q-switched laser. The characteristics of Nd:YVO$_4$ facilitate the generation of short, high peak power Q-switched pulses at high repetition rates, which subsequently facilitates harmonic generation with nonlinear crystals.

In Nighan et al, pulse durations of 7–20 nsec were generated for repetition rates of 10–80 kHz, at an average output power of 3 to 4 W in a TEM$_{00}$ mode. The pump source was a fiber-coupled diode bar, as disclosed in U.S. Pat. Nos. 5,127,068 and 5,436,990. End-pumping of Nd:YVO$_4$ with a pump source like this fiber-coupled bar allows generation of very high small signal gain, since this material has a stimulated emission cross-section that is much higher than that of Nd:YLF or Nd:YAG. This is useful for building a diode-pumped laser with a low laser oscillation threshold, and is also useful for building a laser that provides short pulses at high repetition rates. However, the short upper state lifetime of this material (~100 $\mu$sec) does not allow as much energy storage as is possible with Nd:YLF (500 $\mu$sec) or Nd:YAG (200 $\mu$sec), which limits the amount of pulse energy that can be generated at repetition rates below 10 kHz. For example, an Nd:YVO$_4$ laser pumped at 10 W can provide 200 $\mu$j at low repetition rates, while the YLF laser (designated "TFR" by Spectra-Physics Lasers, described by T. M. Baer, D. F. Head, P. Gooding, G. J. Kintz, S. B. Hutchison, in "Performance of Diode-Pumped Nd:YAG and Nd:YLF in a Tightly Folded Resonator Configuration", IEEE J. Quantum Electron-, vol. QE-28, pp. 1131–1138, 1992) provide ~800 $\mu$J. The application of Nd:YVO$_4$ is thus well suited to generation of short pulses at high repetition rate.

The short, high peak power pulses generated at high repetition rates with Q-switched 3–4 W Nd:YVO$_4$ lasers were also exploited in work by Petersen et al in A. B. Petersen, W. L. Nighan, Jr., *CLEO*, 1995 Technical Digest, paper CWG2, Optical Society of America, Washington, D.C., entitled, "High repetition rate UV generation with Nd:YVO$_4$ lasers". In this work, Petersen describes results with a number of harmonic generation schemes, including noncritically phase-matched (NCPM) frequency-doubling with temperature-tuned LBO (lithium triborate) nonlinear crystals. This is generally considered to be a highly desirable form of frequency-doubling, or second-harmonic generation (SHG). This form of doubling is relatively angle insensitive and preserves the beam quality of the infrared laser. Conversion efficiencies of over 50% were be achieved with a pulsed Nd:YVO$_4$ laser at 10–20 kHz, with nearly diffraction limited beam quality at 532 nm The LBO crystal was a phi=0, theta=90 cut, and the crystal is regulated at nearly 150° C. in an NCPM configuration. Petersen describes the general advantages of LBO, including a high damage threshold and the absence of gray-tracking seen with KTP. Taking advantage of the NCPM frequency doubling, Petersen subsequently demonstrated sum-frequency generation of the third harmonic in a second crystal, also in LBO, but Type II, critically-phase-matched or angle-tuned. The use of LBO has become popularized in recent years, owing to the capacity for NCPM, the high damage thresholds, reasonable nonlinear coefficients, and low-loss. The capacity for non-critical phase-matching in the doubling process is considered to be highly advantageous by those skilled in the art. In combination with the Q-switched Nd:YVO$_4$ laser, the LBO doubling and tripling allows production of laser light at the highly useful wavelength of 355 nm. In Petersen's work, over 600 mW of 355 nm light were generated using an NCPM doubler and an angle tuned tripler. A single fiber-coupled 20 W diode bar was used as the source to end-pump the Nd:YVO$_4$ crystal; only 12 W was used (from the fiber) to achieve the result. The power conversion efficiency from 1.064 microns to 355 nm was therefore 20%, and the conversion efficiency from diode pump power (12 W) to 355 nm was 5%. In some cases, the repetition rate of 20 kHz is high enough allows substitution of the Nd:YVO$_4$ system for traditional high power CW ion lasers operating at 351 nm. One important application is stereolithography, where the UV laser beam is scanned across the surface of a UV sensitive resin in order to "rapidly prototype" solid models of given parts. This application of solid-state and ion lasers in this area is reviewed by Partanen (SPIE 1996).

Alfrey et al (CLEO 1996 PD) presented a diode-pumped Nd:YVO$_4$ laser system that provided 355 nm light via intracavity, Q-switched third harmonic generation. He utilized two LBO crystals placed near one another in a laser cavity, with a side-pumped Nd:YVO$_4$ gain medium placed elsewhere in the cavity. The two LBO crystals were cut at angles that allowed near room-temperature doubling and near room-temperature tripling. The crystals were apparently angle-tuned. Differences between Alfrey's work and that of Petersen et al include: (1) Alfrey's work was intracavity THG, with the two LBO crystals placed very close to one another, with no intervening optics; (2) Alfrey used angle-tuned LBO crystals, and did not utilize NCPM doubling; (3) Alfrey's work utilized the relatively higher average 1.064 micron powers that can be generated intracavity, which are typically on the order of 10 times higher than that available extracavity, as in Petersen's work. Alfrey generated over 2 W of 355 nm light at a Q-switch repetition rate of ~30 kHz. A single, direct coupled 20 W diode bar was used to side-pump the Nd:YVO$_4$ material. The power conversion efficiency from diode light to 355 nm was 10% in this intracavity THG arrangement.

Alfrey's scheme was a Q-switched, intracavity tripled scheme, which generated more UV for a given amount of diode pump light than did the extracavity scheme of Petersen et al. However, an intracavity tripled scheme does expose the nonlinear crystals to much higher average power densities and peak power densities than does an extracavity scheme, such as in Petersen et al. This exposure to high power densities is recognized to be a potential problem by those skilled in the art. Crystal surfaces or coatings may be damaged or degraded by this power density. Still, an extracavity tripled system that matched or exceeded the conversion efficiencies demonstrated by Alfrey would be useful.

Alfrey does not describe the effects of walk-off in the LBO doubler and/or tripler, although one skilled in the art will realize that there are some effects of walk-off in those processes. Alfrey does not consider the use of optics between the two crystals to condition the walk-off of the two beams leaving the doubler prior to their entrance into the tripler. He does not consider an optimal conversion efficiency for a doubling process in order to optimize the efficiency of a tripling process. Finally, Alfrey's scheme is an intracavity scheme, which differs greatly from the extracavity arrangements of Petersen; the ratios of 1064, 532 and 355 nm powers are quite different since the 1.064 power is intracavity and therefore relatively higher in power than an extracavity 1064 nm beam from a similarly pumped laser.

In both Petersen et al and Alfrey, the work was directed towards the generation of high repetition rate UV light near 355 nm. At repetition rates higher than 10 kHz, in some applications, the pulsed 355 nm beam can be used as a substitute for a CW UV laser beam. See for example Partanen et al, SPIE 1996.

The average power generated at the 355 nm harmonic will relate to the peak power and repetition rate of the infrared laser, as well as the high repetition rate average power of the infrared Q-switched laser at the fundamental wavelength. The average power of a CW-pumped, repetitively Q-switched laser approaches its CW non-Q-switched power when the repetition rate exceeds $1/\tau_f$, where $\tau_f$ is the upper-state lifetime of the gain medium. In the case of Nd:YVO$_4$, this repetition rate is ~10 kHz, or $1/(100 \mu sec)$. At lower repetition rates (<10 kHz), the pulse energy is approximately constant. At higher repetition rates (>10 kHz), which are highly useful, the energy per pulse decreases linearly, as the pulse duration increases. This is described in Siegman, Lasers, Chapter 26. While average power is nearly constant for increases in a high repetition rate, the peak power of an individual pulse decreases. This has the result that harmonic average power generation is a function of repetition rate, since harmonic generation efficiency achieved with nonlinear crystals is dependent upon peak power and the harmonic average power is a product of harmonic pulse energy and repetition rate. For these reasons, the maximum average power at a harmonic wavelength is typically achieved at Q-switched repetition rates of $\sim 2(1/\tau_f)$. In Petersen's work, this rate is 20 kHz. In Alfrey's work he reports 30 kHz. Acceptably high conversions can be achieved with Nd:YVO$_4$ lasers from 10 to 40 kHz. For Nd:YAG and Nd:YLF lasers, the maximum average powers upon harmonic generation typically occur at lower repetition rates, such as 2–9 kHz. This is due to the longer upper state lifetimes in this materials, with respect to Nd:YVO$_4$.

It is well-known that a CW-pumped, repetitively Q-switched laser will provide progressively longer pulses if the repetition-rate of the laser is progressively increased. This is one of the reasons for the decrease in harmonic generation efficiency. This is described in "Lasers", by Siegman, in Chapter 26. The reason for this effect is simple. As repetition rate is increased (at rates higher than the reciprocal of the upper state lifetime), the maximum amount of energy stored in the gain medium between Q-switched pulses decreases; this stored energy is proportional to the density of ions in the upper state just before Q-switching. This means that the small-signal gain is decreased, since the small-signal gain depends upon the density of ions still in the upper state. If the small-signal gain is reduced, as it is by increasing the repetition rate, the Q-switched laser pulse will not build up as rapidly in the laser cavity as it would at lower repetition rate. Therefore, at increasing repetition rates, the pulse will be longer, energy lower, and peak power will decrease. This will have a direct impact upon harmonic generation efficiency.

A well-known effect that accompanies harmonic generation with critically phase-matched nonlinear materials is walk-off between ordinary and extraordinary rays in the crystal. For example, an LBO crystal with theta=90° and phi=10° will allow angle-tuned critical phase-matching of 1.064 micron light to its 532 nm second harmonic. At the optimum crystal angle for maximum doubling, the generated 532 nm beam and the fundamental 1.064 micron beam will be separated from one another when the two beams leave the nonlinear crystal. The amount of separation depends upon the length of the crystal and the walk-off angle. This walk-off can be detrimental to a nonlinear conversion process, since beams can literally walk away from one another, thus ending nonlinear interactions. It is sometimes possible to exploit non-critical phase-matching (NCPM), which is well-known to nearly eliminate walk-off between the fundamental and second harmonic beams. A well-known example of this is NCPM LBO for doubling 1.064 micron light to 532 nm. By holding the LBO crystal near 150° C., it is possible to temperature-tune the phase-matching. This is generally considered to be a highly desirable form of frequency-doubling, or second-harmonic generation (SHG). This form of doubling is relatively angle insensitive and preserves the beam quality of the infrared laser. It is described by Petersen at al and Nighan et al, and references contained therein. Conversion efficiencies of over 50% were be achieved with a pulsed Nd:YVO$_4$ laser at 10–20 kHz, with nearly diffraction limited beam quality at 532 nm. The LBO crystal was a phi=0, theta=90 cut, and the crystal is regulated at nearly 150° C. However, non-critical-phase-matching is not always possible. For example, although NCPM doubling with LBO is possible, it is not possible for the LBO tripling crystal, as used by Petersen and Alfrey, to also be non-critically phase-matched. For this reason, the LBO tripling crystal in both schemes was designed to be angle-tuned, or critically phase-matched.

The general problem of walk-off has been addressed by Bosenberg, in U.S. Pat. No. 5,047,668, "Optical walk-off compensation in critically phase-matched three-wave frequency conversion schemes", where Bosenberg describes the use of two identical crystals positioned at tilt angles theta and (-theta), for a total relative angle of 2(theta). In this patent, Bosenberg teaches that two identical crystals can be used, positioned symmetrically at angle theta and (-theta) from the propagation direction. In Bosenberg, the walk-off of the second crystal undoes the walk-off of the first, and the fundamental beam and harmonic beam can therefore exit the crystal pair as overlapped beams. In particular Bosenberg points out that 2 identical crystals of the same cut can be used in opposing orientation where the second crystal completely compensates the walk-off introduced by the first crystal Bosenberg does not consider the use of optics between the two crystals to condition the walk-off of the two beams leaving the doubler. He does not consider an optimal conversion efficiency for a doubling process in order to optimize the efficiency of a tripling process.

Both Petersen and Alfrey use schemes for tripling wherein the doubling crystal and tripling crystal are non-identical;

both are LBO, but the cut angles of the doubling crystal and the tripling crystal with respect to the LBO crystalline axes are different from one another.

Nightingale describes a related problem in U.S. Pat. 5,136,597, "Poynting vector walk-off compensation in Type II phase matching." This relates specifically to the doubling process, especially in an intracavity or resonant cavity method. It does not consider tripling, let alone non-intracavity or non-resonant doubling. Nightingale solved a specific problem with KTP in Type II phase-matching in an intracavity-doubled solid state laser. He did not consider the use of two or more crystals. He does not teach tripling with at least two crystals. However, he does point out that the effects of walk-off may seem to be small numbers, but that even 10's of microns of beam displacement can have dramatic effects when small gaussian beam sizes are used. This is in contrast to prior art with large (few mm diameter), high energy pulsed beams (~1 J), such as described by Craxton et al.

There is a need for a diode-pumped, Q-switched laser that provides pulses at high repetition rate with high efficiency of conversion from 1.064 micron average power to 355 nm average power.

There is a need for an improved method for generation of UV light with solid-state lasers. More specifically, there is a need for an improved combination of LBO phase-matching techniques in order to generate 355 nm light as the third harmonic of diode-pumped 1 $\mu$m solid-state lasers, utilizing techniques of extracavity harmonic generation.

SUMMARY OF THE INVENTION

It is an object of the invention to provide a Q-switched or pulsed diode-pumped solid-state laser system that provides harmonically generated UV light at high repetition rate with high efficiency.

It is another object of the invention to provide a Q-switched or pulsed solid state laser that provides harmonically generated UV light at high repetition rate with high efficiency with Nd:YVO$_4$ as the gain medium.

It is yet another object of the invention to provide a Q-switched or pulsed solid state laser that provides harmonically generated UV light at high repetition rate with high efficiency with nonlinear crystals utilized in an extracavity harmonic generation configuration.

Still a further object of the invention to provide a Q-switched or pulsed solid state laser that provides harmonically generated UV light at high repetition rate with high efficiency, incorporating LBO as the nonlinear harmonic generation medium, with multiple LBO crystals utilized in an extracavity harmonic generation configuration.

Yet object of the invention to provide a Q-switched or pulsed solid state laser that provides harmonically generated UV light at high repetition rate with multiple LBO crystals cut at angles that introduce walk-off between ordinary and extra-ordinary waves in the LBO nonlinear crystals in a manner that optimizes generation of UV.

Still another object of the invention to provide a Q-switched or pulsed solid state laser that provides harmonically generated UV light at high repetition rate with multiple LBO crystals cut at angles that introduce walk-off between ordinary and extra-ordinary waves in the LBO nonlinear crystals, and including an optical device placed in the beam path between the LBO crystals in order to condition the walk-off between the multiple LBO nonlinear crystals in a manner that optimizes the generation of UV.

It is a further object of the invention to provide a Q-switched or pulsed solid state laser that provides harmonically generated UV light at high repetition rate with multiple LBO crystals cut at angles that introduce walk-off between ordinary and extra-ordinary waves in the LBO nonlinear crystals in a manner that optimizes generation of UV, with the conversion efficiency from infrared to green reduced from a maximum IR to green conversion efficiency in order to maximize a conversion efficiency from IR to UV.

Yet another object of the invention to provide a Q-switched diode-pumped solid-state laser that provides 355 nm pulsed output at repetition rates greater than 10 kHz, at powers greater than 100 mW.

These and other objects of the invention are achieved in a diode pumped laser that includes a high reflector and an output coupler defining a resonator. The resonator includes a gain medium and a Q-switch and produces a fundamental beam. A first non-linear crystal is positioned extra-cavity of the resonator along a path of the fundamental beam. The first non-linear crystal generates a second harmonic beam from the fundamental beam. The first non-linear crystal is critically phased matched. A second nonlinear crystal is portioned extra-cavity of the resonator along a path of the fundamental beam and the path of the second harmonic beam. The second non-linear crystal produces a third harmonic beam. The second non-linear crystal is critically phased matched.

In one embodiment, a Q-switched diode-pumped solid-state laser, with an Nd:YVO$_4$ laser crystal placed in the resonator of the laser, said resonator incorporating at least two mirrors, with a Q-switch device placed in the laser resonator, with the pump power density and cavity lifetime balanced to provide short Q-switched pulses at high repetition rate with high stability. The infrared beam from said laser is passed through a doubling crystal that is critically phase-matched. In a preferred embodiment, this doubling crystal is LBO, cut for angle-tuned doubling, operated at a temperature of about 50° C., and cut with an angle phi of about 5 to 15 degrees. In a preferred embodiment, the conversion efficiency to green from IR is reduced to a level below the maximum obtainable level, for example, it is about 30%. The green and IR beams are subsequently passed through a second LBO crystal, this LBO crystal cut for angle-tuned tripling. The conversion efficiency to UV from IR, or to 355 nm from 1.064 $\mu$m, is optimized (such as to >30%) when the conversion efficiency to green from IR, or to 532 nm from 1.064 $\mu$m, is reduced (such as to ~30%). The conversion efficiency from 1.064 $\mu$m to 355 nm is also optimized when the two LBO crystals each introduce some amount of walk-off between the IR and green beams. In a preferred embodiment, this conversion efficiency is optimized further when optical devices are placed in the beam path between the LBO crystals in order to condition the walk-off between the multiple LBO nonlinear crystals.

In a preferred embodiment, the beam quality is nearly diffraction-limited. In one preferred embodiment, the power is greater than 200 mW at 355 nm, and it is possible to generate over 1 W at 355 nm, still with only 1 diode bar. In a preferred embodiment, the LBO crystals are operated at a temperature near 50° C.

In another embodiment over 1.2 W of 355 nm light is generated extracavity from 3.5 W of 1.064 $\mu$m light at 20 kHz. This represents an extracavity conversion efficiency over 30% from 1.064 microns to 355 nm. It represents a conversion efficiency of 10% from fiber-coupled diode pump light to 355 nm Finally, it represents a conversion efficiency of about 7.5% from raw diode bar output to 355 nm light. Nd:YVO$_4$ and an angle-tuned LBO doubler and an angle-tuned LBO tripler have been incorporated for the first time in an extracavity-tripled, high power (>100 mW), high repetition rate (>10 kHz), high beam quality (M$^{2<}$2), Q-switched diode-pumped solid-state laser. In a preferred embodiment, it provides over 300 mW in average output power at repetition rates greater than 20 kHz.

In various embodiments the laser of the present invention provides over 1 W at 355 nm. Additionally, the output of the UV laser system is optimized for stereolithgraphy applications.

BRIEF DESCRIPTION OF THE DRAWING

FIG. 1 is a diagram of a critically phase-matched doubling process followed by a critically-phase-matched tripling process.

FIG. 2 is a diagram of a Q-switched, diode-pumped, Nd:YVO$_4$ solid-state laser and an extracavity harmonic generation scheme utilized in a preferred embodiment of the invention.

DETAILED DESCRIPTION OF THE PREFERRED EMBODIMENTS

Figure 3:
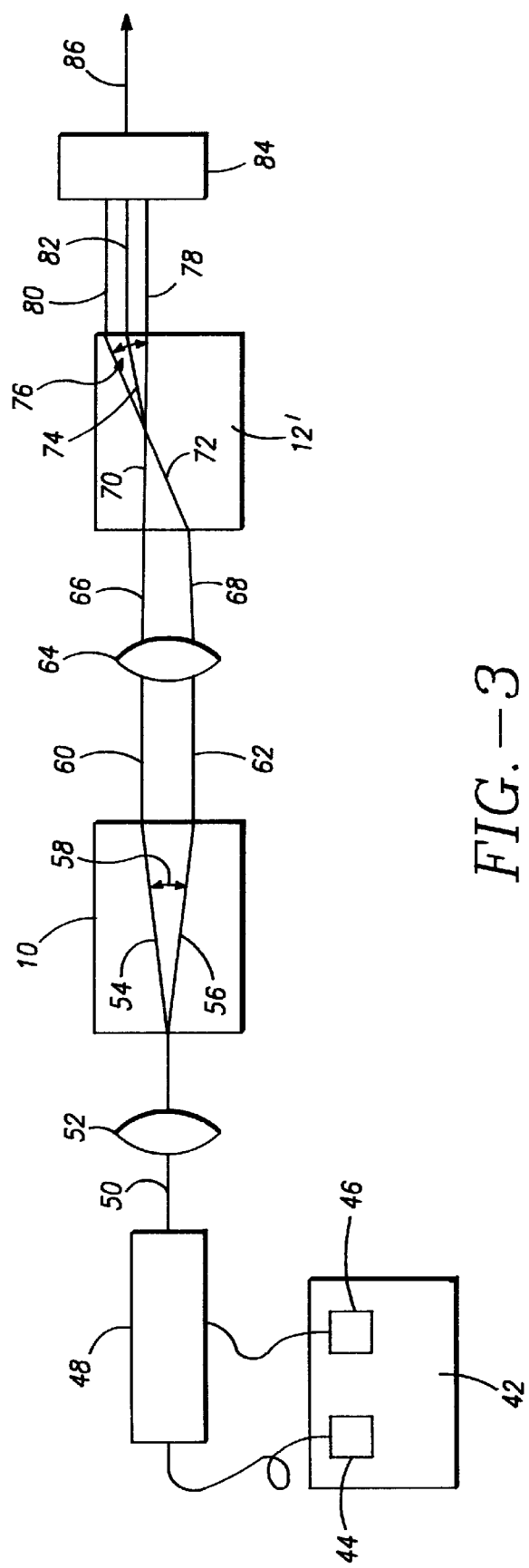
FIG. 3 is a schematic diagram of one embodiment of the invention.

The present invention is a diode pumped laser includes a high reflector and an output coupler defining a resonator. The resonator includes a gain medium and a Q-switch and produces a fundamental beam. A first non-linear crystal is positioned extra-cavity of the resonator along a path of the fundamental beam. The first non-linear crystal generates a second harmonic beam from the fundamental beam. The first non-linear crystal is critically phased matched. A second non-linear crystal is portioned extra-cavity of the resonator along a path of the fundamental beam and the path of the second harmonic beam. The second non-linear crystal produces a third harmonic beam. The second non-linear crystal is critically phased matched.

In one embodiment, the first non-linear crystal is made of LBO. In a second embodiment, the second non-linear crystal is made of LBO. The first non-linear crystal can have a cut of phi in the range of 5 to 10 degrees and theta in the range of 85 to 90 degrees. The second non-linear crystal can have a cut of phi in the range of 85 to 90 degrees and theta in the range of 42 to 47 degrees. The gain medium may be Nd:YVO$_4$. The resonator may be Q-switched at repetition rates of 10 KHz and greater.

An optical element can be positioned between the first non-linear crystal and the second non-linear crystal. The optical element modifies a walk-off between the fundamental and the second harmonic beams. An efficiency of conversion from the fundamental beam to the second harmonic beam is less than a maximum efficiency of conversion to increase an efficiency of conversion from the fundamental beam to the third harmonic beam. An efficiency of conversion from the fundamental beam to the second harmonic beam is in the range of 25 to 35%. The efficiency of conversion from the fundamental beam to the second harmonic beam is less than a maximum efficiency of conversion to increase an efficiency of conversion from the fundamental beam to the third harmonic beam. The efficiency of conversion from the fundamental beam to the second harmonic beam is in the range of 25 to 35%. In one embodiment, the efficiency of conversion from the fundamental beam to the second harmonic beam is 30%.

Referring now to FIGS. 1 and 2 arrangements of LBO doubling and tripling crystals 10 and 12 do not use zero-walk-off NCPM doubling. A preferred embodiment utilizes a critically phase-matched, angle-tuned doubling LBO crystal 10, followed by a critically phase-matched tripler crystal 12. In one embodiment, the doubler is a phi=5 to 15 degree cut, rather than a phi=zero, theta=90 cut that is well-known to be useful for NCPM. In this embodiment, LBO doubling crystal 10 is operated at a temperature of 50° C., as opposed to the typical 150°–160° C. utilized for NCPM. A fundamental 1064 nm beam 16 is incident upon LBO angle-tuned doubling crystal 10, with an intracrystal fundamental beam 18 and an intracavity doubled beam 20 generated in crystal 10. A relative walk-off 22 between the two is generated by this type of frequency-doubling, as is well-known. The doubled 532 nm beam and 1064 nm beam leave doubling crystal 10 as beams 24 and 26, respectively, and enter critically phase-matched tripling crystal 12. Beams 28 and 30 are separated from one another after leaving crystal 10. Doubled and infrared beams 28 and 30 have finite spatial extent, as is well-known. Beams 28 and 30 may overlap partially, but they do not overlap perfectly as in the case of NCPM.

The beams 24 and 26 enter LBO tripling crystal 12, where the intracrystal 1064 nm beam 30 and intracrystal 532 nm beam 28 propagate through LBO tripling crystal 12. In FIG. 1, tripling crystal 12 is oriented in a way that the walk-off 32 introduced by LBO tripling crystal 12 is such that beams 28 and 30 walk still further apart. If the beams 28 and 30 have spatial extent that allows some overlap in crystal 12, a tripled UV beam 34 is generated at 355 nm, as beams 28 and 30 mix via sum-frequency mixing, as is well-known. Beams 36, 38 and 40 leave crystal 12 as 1064 nm, 532 nm, and 355 nm output beams, respectively, save for Fresnel losses, which are well-known.

Ideally, a high percentage of 1064 nm power in beam 16 has been converted to power at 355 nm in beam 40. However, the "walk-off adding" configuration of FIG. 1 has been found to be inefficient. For example, a 1064 nm beam 16 of 3.5 W power, pulsed at 20 kHz, is converted to only 100 mW of 355 nm power in beam 40 in the configuration illustrated in FIG. 1.

In FIG. 2, LBO tripling crystal 12' is positioned in an opposite sense to that in FIG. 1. Crystal 12 is rotated 180 degrees with respect to the position shown in FIG. 1. In this case, the 1064 nm beam 30 and the green 532 nm beam 28 walk towards one another in tripling crystal 12' with walk-off angle 32', generating 355 nm beam 34 in crystal 12', and 355 nm beam 40 exits crystal 12'. The 1064 nm and 532 nm beams 36 and 38 also leave crystal 12', with beams 36,38 and 40 experiencing some Fresnel loss, as is well-known. In this embodiment, with a 1064 nm beam 16 of 3.5 W power in the form of Q-switched ~10 nsec pulses at 20 kHz, over 1.25 W of 355 nm light was generated, which is a 36% power conversion. Approximately 12 W of diode pump light was used, so the 1.25 W of 355 nm represents a >10% conversion efficiency from fiber-coupled diode pump light to 355 nm output power.

Not shown in FIGS. 1 and 2 are optional optics in the path of beams 24 and 26, in between doubling and tripling crystals 10 and 12'. Such optics can adjust relative position and angles of beams 24 and 26. One example is a simple lens or a focussing concave mirror or mirrors (not shown). Such an optic takes beams 24 and 26 and modifies the relative angle between them and may modify the relative position. These modifying optics can include but are not limited to lenses, mirrors, dispersive optics or elements, refractive optics or elements, and diffractive optics or elements.

In one embodiment, the intermediate conversion efficiency of 1064 nm to 532 nm has an optimum with respect to the amount of 355 nm light produced. It is possible to convert over 60% of the 1064 power to power at 532 nm. However, optimal 355 nm power is not obtained at such high conversions to 532 nm. Such a high conversion can distort the spatial and temporal character of the 1064 nm beam, thus degrading the sum frequency process of 1064 plus 532 nm in generating 355 nm power. Optimal conversion of 1064 nm to 355 nm is obtained when the intermediate conversion to 532 nm is reduced to ~30%. There are numerous methods to reduce this efficiency including but not limited to translation of doubling crystal 10 to a plane of reduced 1064 nm power density, angle detuning, temperature detuning and the like.

The development of highly efficient tripling configurations utilizing LBO is important for several reasons including, (i) provision of more UV power for a given amount of diode pump power, (ii) capability to reduce diode current and enhance diode lifetime, (iii) capability to reduce power densities on the non-linear crystals in order to prevent damage and prolong lifetime of the non-linear crystals and (iv) capability for generating higher UV powers at high repetition rates such as 40 KHz.

As illustrated in FIG. 3, a power supply 42 houses a fiber-coupled diode module 44 and RF driver 46, and drives Q-switced Nd:YVO$_4$ laser head 48. This is available from Spectra-Physics Lasers as a B10-106Q, and is described in Nighan and Petersen. It produces 1064 nm beam 50, which can be a 3 W average power beam of Q-switched 10 nsec pulses at 20–30 kHz. The beam quality is typically measured as $M^2$<1.2. Beam 50 is focussed by one or more optics 52, as described above. The focussed 1064 nm beam 54 in doubler crystal 10 maybe on the order of 50 μm radius. A doubled beam 56 is generated, with a relative walk-off angle 58 with respect to beam 54. Typical walk-off angles can be on the order of 0.5 degrees. The depleted 1064 nm beam 60 leaves doubling crystal 10, as does doubled exit beam 62. Beams 60 and 62 are separated by the walk-off from the angle-tuned, critically phase-matched doubling crystal 10. A second optic or group of optics 64 focusses the 1064 nm and 532 nm beams 60 and 62, resulting in focussed beams 66 and 68. Optics 64 can be a lens or lenses, or mirrors, or other optics. In a preferred embodiment, optics 64 are a pair of concave mirrors.

LBO tripling crystal 12' for Type II 355 nm generation from mixing of 1064 nm and 532 nm is typically cut for theta=42 to 47 degrees, with phi=90°. An angle of ~42 degrees is used with the tripling crystal at a temperature of 50° C., while an angle of ~44 degrees can be used for 70° C. Typical lengths are 10 mm, but can be made longer or shorter depending upon beam sizes and overlaps. Uncoated crystals are used in a preferred embodiment, although coated crystals 12' can also be used. The optical surfaces of crystal 12' is polished to good optical quality, as is required and well-known for laser use. LBO crystals can be procured from Fujian Casix or Fujain Castech, in the Fujian province of China. Crystal 12' ends may be wedged with respect to one another, with a wedge angle of about 1 degree.

Infrared beam 70 and green beam 72 interact in tripling crystal 12' generating third harmonic beam 74. The relative walk-off of beams 70 and 72 is angle 76. In one embodiment, angle 76 and angle 58 at least partially compensate one another. Beams 78, 80 and 82 exit from tripling crystal 12' as depleted fundamental, depleted second harmonic and third harmonic beams respectively. Filter element 84 is used to block beams 78 and 80. However, filter element 84 transmits third harmonic beam 82, providing output beam 86. Filter element 84 can be a coated optic or optics, a prism or other dispersive, refractive or diffraction devices.

Figure 4:
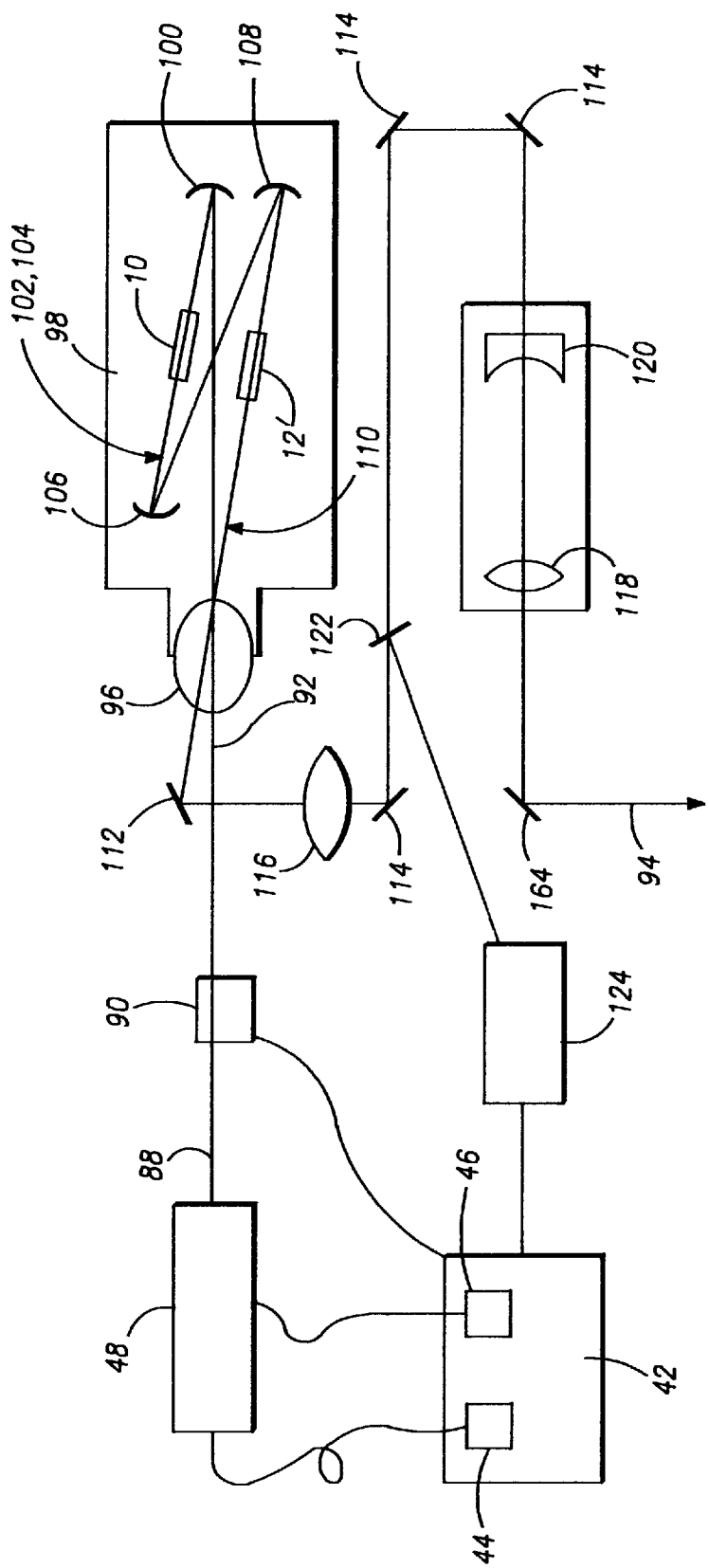
FIG. 4 is a schematic diagram of a system of the invention utilized with stereolithography.

As shown in FIG. 4, a beam 88 leaves Q-switched Nd:YVO$_4$ laser 48, passing through an acousto-optic modulator 90 as beam 92. A suitable modulator 90 is available from Crystal Technologies, Mountain View, Calif. Modulator 90 modulates beam 88 which results a modulated output beam 94 at 355 nm. Preferably, modulator 90 is made of TeO$_2$. Modulated 1064 nm beam 92 passes through window 96 into tripler housing 98. Window 96 can be a Brewster window. Housing 98 is sealed to protect crystals 10 and 12'. Modulated beam 92 strikes a concave optic 100 which focuses modulated 1064 nm beam 92 into LBO doubling crystal 10. Optic 100 has a 10 cm radius of curvature and is a high reflector at 1064 nm. Depleted infrared 102 and doubled beam 104 are incident on concave mirrors 106 and 108, which modify the relative walk-off between beams 102 and 104. Mirrors 106 and 108 have radii of curvatures of 10 cm and 15 cm, respectively, and are high reflectors at 1064 nm and 532 nm. Beams 102 and 104 are focused into tripling crystal 12', generating a third harmonic beam 110.

Beam 110 exits housing 98 and strikes turning mirrors 112 and 114. Mirrors 112 and 114 are highly reflecting at 355 nm and transmitting at 1064 nm and 532 nm, and thus act as a filter. Also included in the beam train are lenses 116, 118 and 120, which are used to manipulate the beam size and propagation characteristics of 355 nm beam 110, as is well known. Also included in the beam train is a beam splitter 122 which directs a fraction of 355 nm beam 110 into a detector 124 which is coupled to power supply 42. This detection can be used for power monitoring or closed loop feedback using diode current or acoustic-optic modulator 90. In one embodiment, output beam 94 has power of greater than 240 mW at 355 nm at a repetition rate of 40 KHz. In another embodiment, output beam 94 has a power of greater than 500 mW at 355 nm at a repetition rate of 40 KHz. In another embodiment, output beam 94 has a power of greater than 1 W at 355 nm at a repetition rate of 20 KHz.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A diode pumped laser, comprising:

a high reflector and an output coupler defining a resonator, the resonator including a gain medium and a Q-switch, wherein the resonator produces a fundamental beam;

a first non-linear crystal positioned extra-cavity of the resonator and along a path of the fundamental beam, the first non-linear crystal generating a second harmonic beam from the fundamental beam, wherein the first non-linear crystal is critically phased matched;

a second non-linear crystal portioned extra-cavity of the resonator and along a path of the fundamental beam and the path of the second harmonic beam, wherein the second non-linear crystal produces a third harmonic beam, wherein the second non-linear crystal is critically phased matched.

2. The laser of claim 1, wherein the first non-linear crystal LBO.

3. The laser of claim 2, wherein the second non-linear crystal LBO.

4. The laser of claim 3, wherein the first non-linear crystal has a cut of phi in a range of 5 to 10 degrees and theta is in a range of 85 to 90 degrees.

5. The laser of claim 3, wherein the second non-linear crystal has a cut of phi in a range of 85 to 90 degrees and theta is in a range of 42 to 47 degrees.

6. The laser of claim 1, wherein the second non-linear crystal LBO.

7. The laser of claim 1, wherein the gain medium is $Nd:YVO_4$.

8. The laser of claim 1, wherein the resonator is Q-switched at repetition rates of 10 KHZ and greater.

9. The laser of claim 1, further comprising:
an optical element positioned intermediate the first non-linear crystal and the second non-linear crystal, wherein the optical element modifies a walk-off between the fundamental and the second harmonic beams.

10. The laser of claim 9, wherein an efficiency of conversion from the fundamental beam to the second harmonic beam is less than a maximum efficiency of conversion to increase an efficiency of conversion from the fundamental beam to the third harmonic beam.

11. The laser of claim 10, wherein the efficiency of conversion from the fundamental beam to the second harmonic beam is in a range of 25 to 35%.

12. The laser of claim 10, wherein the efficiency of conversion from the fundamental beam to the second harmonic beam is 30%.

13. The laser of claim 1, wherein an efficiency of conversion from the fundamental beam to the second harmonic beam is less than a maximum efficiency of conversion to increase an efficiency of conversion from the fundamental beam to the third harmonic beam.

14. The laser of claim 13, wherein the efficiency of conversion from the fundamental beam to the second harmonic beam is in a range of 25 to 35%.

15. The laser of claim 13, wherein the efficiency of conversion from the fundamental beam to the second harmonic beam is 30%.

* * * * *